Patented Apr. 10, 1951

2,547,920

UNITED STATES PATENT OFFICE 2,547,920

FUSION OF VANILLIN

Fred Fortess and Blanche B. White, Summit, N. J., assignors to Celanese Corporation of America, New York, N. Y., a corporation of Delaware No Drawing. Application June 29, 1949, Serial No. 102,160

1 Claim. (Cl. 260—521)

This invention relates to the fusion of vanillin and relates more particularly to a process for fusion vanillin to produce vanillic and protocatechuic acids.

It is an important object of this invention to provide an improved process for fusing vanillin to produce vanillic and protocatechuic acids, which will be less expensive and more efficient than previous processes suggested for this purpose.

A further object of this invention is the provision of an improved process for fusing vanillin to produce vanillic and protocatechuic acids in a sodium hydroxide melt containing initially water in an amount of from 20 to 60 per cent by weight, based on the total weight of the melt.

Other objects of this invention will be apparent from the following detailed description and claim.

It is known that vanillin may be converted to vanillic acid (3-methoxy-4-hydroxy-benzoic acid) and protocatechuic acid (3-4-dihydroxy-benzoic acid) by fusion with a large excess of potassium hydroxide. Attempts to substitute the less expensive sodium hydroxide for potassium hydroxide in this process have hitherto been unsuccessful, as have attempts to reduce the proportion of alkali, since they resulted in a marked decrease in the yield of the desired products.

We have now discovered that vanillin may be readily converted to vanillic and protocatechuic acids in high yields by fusion with a sodium hydroxide melt containing initially water in an amount of from 20 to 60 per cent, and preferably from 20 to 30 per cent, by weight, based on the total weight of the melt. While the use of a large excess ranging up to 15 moles of sodium hydroxide for each mole of vanillin is not objectionable in our process, we have found that the addition of the specified quantities of water permits the fusion of vanillin to be carried out with as little as from 4 to 6 moles of sodium hydroxide for each mole of vanillin, thereby effecting a saving in cost. In general, as the mole ratio of sodium hydroxide to vanillin is reduced, the quantity of water should be increased.

In carrying out our process, we mix the sodium hydroxide and water and heat said mixture until the sodium hydroxide dissolves to form a clear melt. With the quantity of water employed in our process, this takes place at a temperature below 81° C., the melting point of vanillin. The vanillin is then added to the melt with stirring while the melt temperature is maintained below 81° C. to prevent any loss of vanillin by sublimation, which takes place when the vanillin is added to the melt at higher temperatures. The melt is then raised to the reaction temperature, which may range from 190 to 240° C. for the production primarily of vanillic acid, from 265 to 300° C. for the production primarily of protocatechuic acid and from 240 to 265° C. for the production of a mixture of vanillic and protocatechuic acids and maintained at said temperature with constant stirring until the reaction is completed, which usually takes from 60 to 90 minutes. During the reaction, the melt, which is originally fluid, passes through a viscous stage and finally becomes solid. However, the solid which is formed is friable so that it can be broken up readily and stirring continued throughout the entire process to permit uniform heating. After the reaction is complete, the vanillic and protocatechuic acids can be readily separated from the fusion mixture in a highly purified state.

The following example is given to illustrate this invention further.

Example

A mixture containing 80 parts by weight of sodium hydroxide and 50 parts by weight of water is heated to a temperature of 65° C. at which temperature a clear solution of sodium hydroxide is obtained. To this solution are added, with stirring, 50 parts by weight of vanillin and the mixture so formed is raised to a temperature of 205–240° C. and maintained at said temperature with stirring. At the end of 90 minutes, the fusion mixture which is in the form of fine solid particles, is cooled and dissolved in 750 parts by weight of water. The resultant solution is acidified by saturation with sulfur dioxide and cooled to 10° C., at which point a copious precipitate of vanillic acid crystals forms. The vanillic acid crystals are filtered, washed with cold water saturated with sulfur dioxide and dried. A yield of 45 parts by weight or 81.0% of theoretical of vanillic acid crystals are obtained. The filtrate from the vanillic acid crystals is extracted three times with 200 parts by weight of ethyl ether and the ether extract evaporated to dryness. A yield of 4.5 parts by weight or 8.0% of theoretical of a mixture of vanillic and protocatechuic acids is obtained; the latter being formed during the reaction simultaneously with the vanillic acid. After the ether extraction, the filtrate from the vanillic acid crystals is acidified by the addition thereto of 150 parts by weight of sulfuric acid, boiled to remove free sulfur dioxide and extracted twice with 300 parts by weight of ethyl ether. The ether extract is evaporated to dryness to give a yield of 3.5 parts by weight or 7.0% of unreacted vanillin.

It is to be understood that the foregoing detailed description is given merely by way of illustration and that many variations may be made therein without departing from the spirit of our invention.

Having described our invention, what we desire to secure by Letters Patent is:

A process which comprises forming a melt of 80 parts by weight of sodium hydroxide and 50 parts by weight of water, adding 50 parts by weight of vanillin to said melt while maintaining said melt at a temperature below 81° C., and raising the temperature of said melt to 205 to 240° C. for 90 minutes.

FRED FORTESS.
BLANCHE B. WHITE.

REFERENCES CITED

The following references are of record in the file of this patent:

UNITED STATES PATENTS

| Number | Name | Date |
| --- | --- | --- |
| 2,441,839 | Pearl | May 18, 1948 |

OTHER REFERENCES

Pearl: J. Am. Chem. Soc., vol. 68, pp. 2180–2181 (1946).